Dec. 25, 1962 T. V. DAHLGREN ETAL 3,070,154
ENGINE HEATER DEVICE
Filed May 9, 1960 3 Sheets-Sheet 1

INVENTORS
Tore Viktor Dahlgren
Karl Eric Ericason
BY
Jarvis C. Marble
ATTORNEY

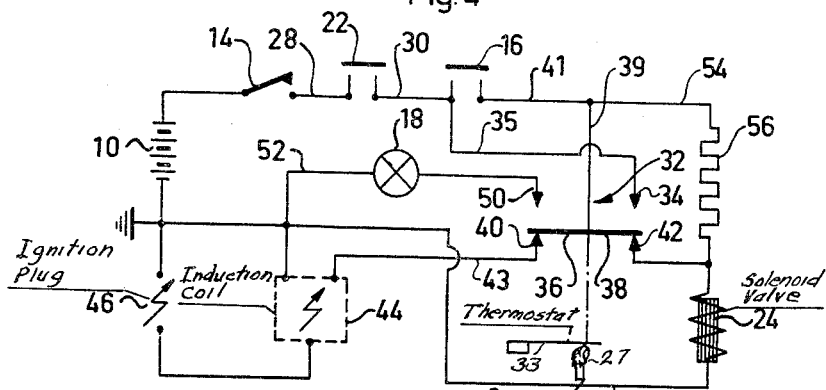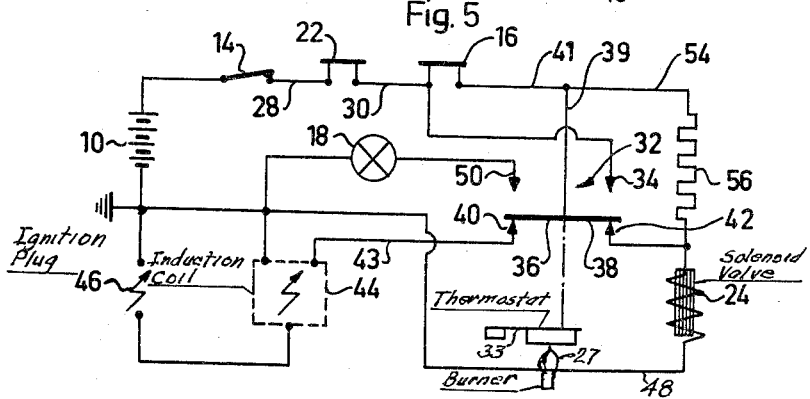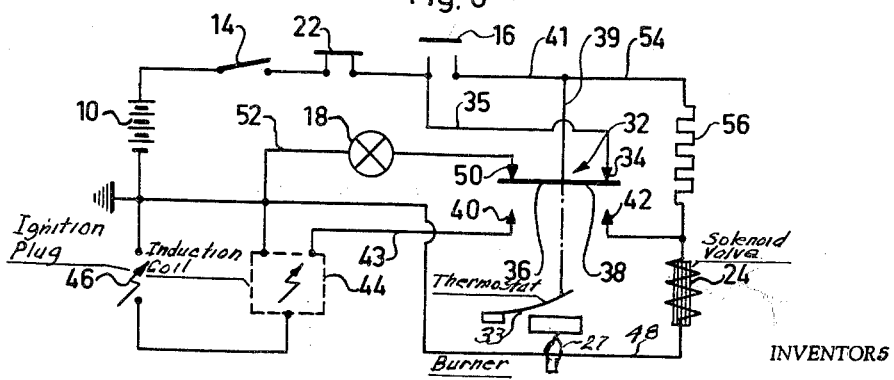

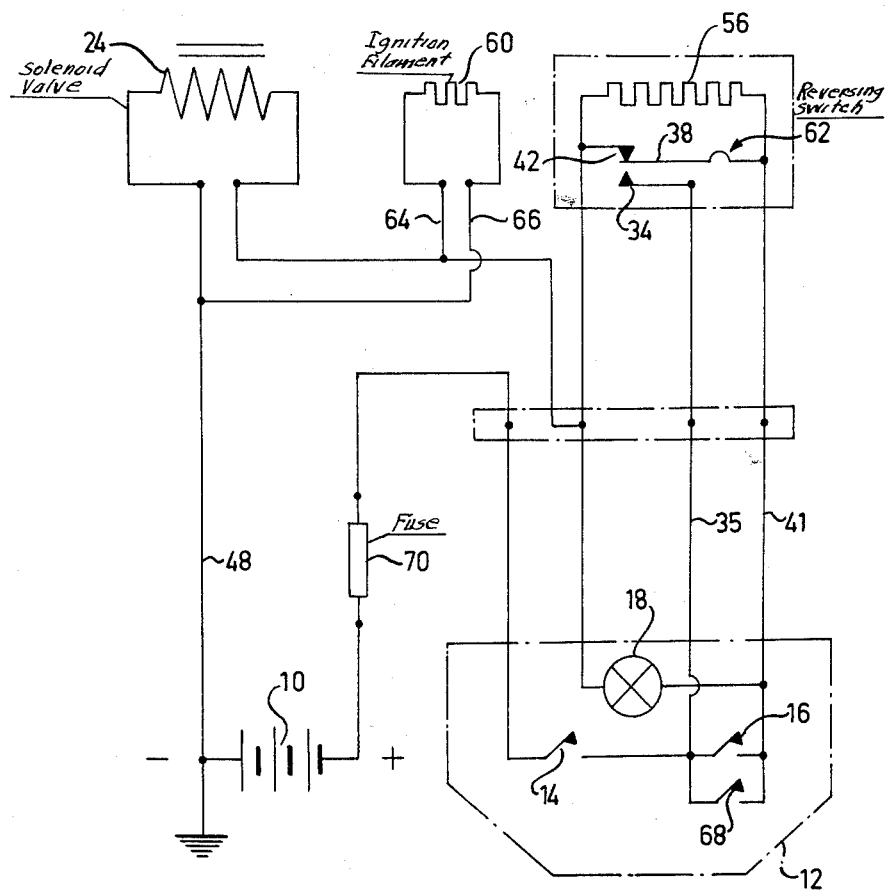

United States Patent Office 3,070,154
Patented Dec. 25, 1962

3,070,154
ENGINE HEATER DEVICE
Tore Viktor Dahlgren, Djursholm, and Karl Eric Ericsson, Sundbyberg, Sweden, assignors to Aktiebolaget Max Sievert, Sundbyberg, Sweden, a corporation of Sweden
Filed May 9, 1960, Ser. No. 27,615
Claims priority, application Norway May 11, 1959
3 Claims. (Cl. 158—125)

The present invention relates to engine heaters.

More particularly the present invention relates to engine heaters of the type provided with a hollow double-walled container adapted to be connected at two different levels with the cooling water system of the engine and to be heated by means of a burner.

The engine heater is intended in the first instance to be used for the heating of motor car engines prior to the start in cold weather. The burner is fed with fuel preferably in gaseous form through a valve actuated by a magnet, said magnet and an induction coil and an ignition plug being supplied with current from the storage battery of the car for opening of the valve and ignition of the burner, respectively, upon closing of a manually operated switch.

One main object of the invention is to provide an improvement of engine heaters of the type set forth by reducing the drain of current from the battery during operation of the heater.

According to a main feature of the invention two circuits are connectable through the battery and the manually operated switch to another switch actuated by a thermostat in turn controlled by the burner, the one circuit including the induction coil and the ignition plug and the other circuit the magnet. A shunt circuit disposed between the manually operated switch and the magnet including a resistance in such a manner that when starting the engine heater both circuits are connected to the battery but after ignition of said burner the thermostat actuated switch interrupts said circuits and only the shunt circuit receives current from the battery to retain the valve in its open position. The induction coil requires relatively high intensity of the current but needs be in operation during a short period only. In the same manner the magnet of the valve requires a relatively high intensity of current for the opening operation proper while the retaining of the valve in its open position needs substantially less current supply to the magnet which is rendered possible by the shunt circuit and the resistance included therein.

Further objects and advantages of the invention will become apparent from the following description, considered in connection with the accompanying drawings, which form part of this specification and of which:

FIGS. 1 to 3 are diagrammatic views of an engine heater device embodying the invention and FIGS. 4 to 6 show a wiring diagram with various operative positions of co-operating elements.

FIG. 7 illustrates a modified embodiment of the invention.

In the various figures the same reference numerals have been used to denote the same or equivalent parts.

Figure 1:
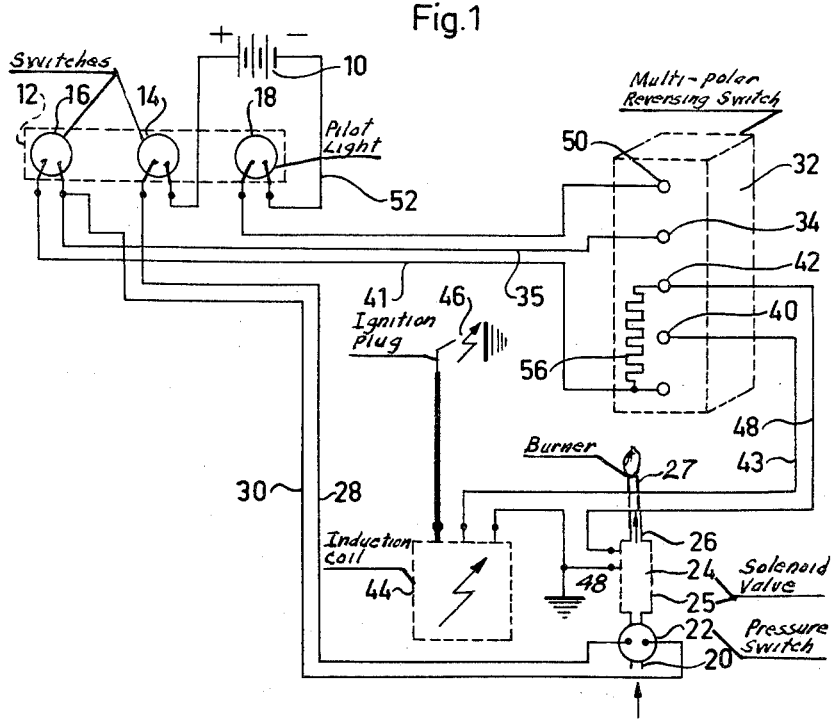
Figure 2:
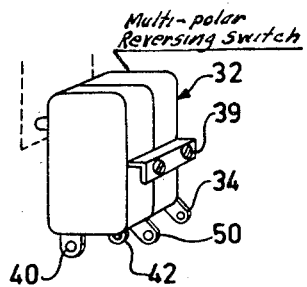
Figure 3:
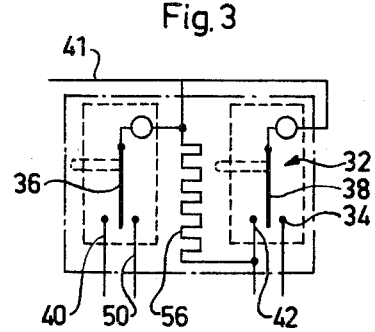

Referring to FIGS. 1 to 6, reference numeral 10 denotes the storage battery of a car engine and reference numeral 12 an instrument panel located in front of the driver's seat, said instrument panel being provided in conventional manner with a battery master switch 14. The equipment necessary for operation according to the invention comprises a manually operated switch in the embodiment shown as a push button switch 16 and preferably also a pilot lamp 18 which equipment parts both are positioned on the instrument panel.

Connected to a container (not shown) for a gaseous fuel preferably in compressed liquid state is a pipe 20 provided with a gas pressure responsive contact 22 and extending to a valve 25 actuated by an electro-magnet 24. From said valve 25 a conduit 26 extends to a burner 27 of an engine heater. Said engine heater is not shown but is suitably constructed as is disclosed in the present assignee's co-pending patent application Serial No. 812,273, filed May 11, 1959, by Karl Eric Ericsson, one of the applicants of the present application. The gas pressure responsive contact 22 is by conductors 28, 30 connected with one pole of the battery master switch 14 and of the push button switch 16. In order to allow current to pass from the battery to the switch 16 the pipe 20 must be under pressure.

A multi-polar reversing switch 32 controlled by a thermostat has a pole 34 through a conductor 35 directly connected with the conductor 30 and contact arms or a double arm 36, 38 connected through conductors 39, 41 to the switch 16. The reversing switch 32 has further two poles 40, 42 of which the former through a conductor 43 is in series connection with an induction coil 44, an ignition plug 46 and ground or the negative pole of the battery, respectively. The pole 42 is included in a circuit 48 leading to ground or the negative pole of the battery 10, respectively, said circuit 48 also including the magnet 24. The reversing switch 32 has further a pole 50 connected to a circuit 52 which includes the pilot lamp 18 and is connected to ground or the negative pole of the battery, respectively. A shunt circuit 54 connects the conductor 41 with the magnet 24 and includes a series resistance 56.

FIG. 4 shows the position of the various elements when the engine heater is out of operation. The battery master switch 14 is supposed to be off. In the same manner the gas responsive contact 22 and the push button switch 16 are off, the whole system thus being without current. The contact arms or the double arm 36, 38 are kept pressed by spring force against the two poles 40, 42. In the operative stage illustrated in FIG. 5, the battery master switch 14 has been closed and the pipe 20 is under pressure for which reason the gas pressure responsive contact 22 connects the conductors 28 and 30 with one another. Further the push button switch 16 is on and current flows from the positive pole of the battery 10 through the conductors 39, 41 to the contact arms 36, 38. Due to the abutment of these latter against the poles 40, 42 the magnet 24 is supplied with current so as to cause the valve 25 controlled by said magnet to go into open position and to allow gas to flow to the burner. Current is also supplied to the induction coil 44 and the ignition plug 46 causing ignition of the mixture of gas and air leaving the burner. Both said operations require a relatively high intensity of current but they last only for a short period. When the burner has been ignited the hot gases of combustion leaving said burner will actuate a thermostat 33 which in turn will actuate the arms 36, 38 so as to cause them to contact the poles 34, 50 of the switch 32 as is indicated in FIG. 6. By this operation the supply of current to the induction coil 44 and also to the magnet 24 through the pole 42 is interrupted.

As will be understood from FIG. 4 the shunt circuit 54 was short circuited during the first starting period, the magnet 24, however, receiving the required current through contact 42, arm 38 and conductor 39 from conductor 41. Upon the operation of the contact arms 36, 38 according to FIG. 6 by actuation of the thermostat 33, current is supplied to and flows through the shunt circuit 54, the supply now being effected through the conductor 35, the pole 34, the arm 38 and the conductor 39. The sole circuit now alive includes the resistance 56 and the magnet 24 which as is easily understood means that the consumption of current is substantially reduced but nevertheless fully sufficient to retain the magnet valve 25 in its open position.

As will be seen from FIG. 6, the pilot lamp 18 is also alive in a circuit closed in relationship to the battery 10. By ignition of the pilot lamp 18 which will occur after a short period of, for example ten to eighteen seconds, the switch 16 may be allowed to be switched off. In the embodiment shown in FIGS. 1 to 6, the engine heater is cut off upon performed heating by means of the battery master switch 14 which also disconnects the last circuit alive hitherto. The gas pressure responsive contact which is of particular value if the engine heater is controlled by a timer disconnects the current when the gas in the storage container is being exhausted and further makes all closing of circuits impossible in case that the discharge valve of said storage container should not have been opened.

The embodiment shown in FIG. 7 differs from the preceding one mainly by the feature that the induction coil 44 and the ignition plug 46 have been replaced by a heating plug or filament 60. Further the reversing switch 32 has been replaced by a reversing switch 62 which also is controlled by a thermostat but has only two poles 34, 42. In the same manner as in the preceding embodiment the electro-magnet 24 is fed with current during the initial operation through the arm 38 of the reversing switch by contact of said arm with the pole 42. The heating filament 60 is through conductors 64, 66 connected in parallel with the electro-magnet 24 in relationship to the storage battery 10 so that the heating filament 60 also receives current through the pole 42 of the reversing switch 62. By the readjustment of the arm 38 causing the latter to take contact with the pole 34 not only the electro-magnet 24 but also the heating filament 60 are connected in series with the series resistance 56. Both the electro-magnet 24 and the heating filament 60 will thus be fed with current of reduced intensity. With regard to the heating filament 60 said supply of current is without appreciable heating effect and is so insignificant as not to drain the storage battery to an appreciable degree. By this arrangement the advantage of a simpler reversing switch is gained without any appreciable waste of current.

In the embodiment shown in FIG. 7 the pilot lamp 18 is on during the whole operation of the engine heater but due to the insignificant input of the lamp the consumption of current by the lamp does not drain the starting battery in any appreciable manner. Reference numeral 68 denotes a switch intended to be combined with a timer if automatic switching on of the engine heater is desired at a predetermined time before the car is to be used. The system may also include a fuse 70.

While several more or less diagrammatic embodiments of the invention have been shown and described it is to be understood that this is for purpose of illustration only and that the invention is not to be limited thereby, but its scope is to be determined by the appended claims.

What we claim is:

1. A control system for an engine heater including a burner and a solenoid operated fuel valve for the burner, said system comprising a battery, a manually operable switch connected to said battery, a change over switch having a first contact, a second contact and a common contact normally biased to one position engaging said first contact, said common contact being connected to said manual switch, a thermostat adopted to be responsive to heat from said burner for moving said contact to a second position engaging said second contact, said second contact being connected to said battery, ignition means for said burner, said solenoid being connected to said first contact, a series resistor connected to said solenoid and to said common contact and circuit means connected to said battery for energizing said ignition means upon energization of said solenoid, whereby upon closing said manual switch said solenoid will be energized to open said valve and said ignition means will be energized to ignite said burner and upon movement of said common contact to said second position engaging said second contact said ignition means will be rendered inoperative and said resistor will be rendered operative to supply a reduced current to said solenoid to maintain said valve open.

2. A control system as defined in claim 1 in which said ignition means comprises an induction coil and a spark plug and in which said circuit means includes a third contact in said change-over switch which is disengaged upon movement of said common contact to said second position.

3. A control system as defined in claim 1 in which said ignition means comprises a heating filament connected in parallel with said solenoid for operation at full current and connected through said resistor in said second position to render said filament inoperative for ignition purposes and to draw a reduced current.

References Cited in the file of this patent
UNITED STATES PATENTS

| | | |
|---|---|---|
| 2,159,257 | Danuser et al. | May 23, 1939 |
| 2,366,774 | Eskin et al. | Jan. 9, 1945 |
| 2,531,887 | Nehrbas | Nov. 28, 1950 |
| 2,544,511 | Pratt | Mar. 6, 1951 |